(No Model.)

R. S. WARING.

UNITING AND BRANCHING ELECTRIC CABLES.

No. 268,159. Patented Nov. 28, 1882.

Witnesses.
A. Ruppert,
Minter P. Key

Inventor:
Richard S. Waring
per O. E. Duffy
Atty.

UNITED STATES PATENT OFFICE.

RICHARD S. WARING, OF PITTSBURG, PENNSYLVANIA.

UNITING AND BRANCHING ELECTRIC CABLES.

SPECIFICATION forming part of Letters Patent No. 268,159, dated November 28, 1882.

Application filed September 21, 1882. (No model.)

*To all whom it may concern:*

Be it known that I, RICHARD S. WARING, of Pittsburg, in the county of Allegheny and State of Pennsylvania, have invented certain new and useful Improvements in Uniting and Branching Electric Cables; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in that class of cables for the transmission of electric currents which are composed of insulated wires surrounded by an armor of lead or other ductile material, the said armor being formed with longitudinal ribs with the insulated wires or conductors extending through them, and which may also be provided with a central or longitudinal insulated wire or group of wires.

My invention consists, first, in an improved method of forming branch connections at any point in the cable or section thereof by cutting through one or more of the ribs transversely and longitudinally a suitable distance, opening the parts outward, then severing the insulated conductor, bending the ends so formed outward, and finally filling the cavity with insulating material, and closing the divided parts of the armoring thus opened and soldering the same.

The invention further consists in a method of uniting the sections of the cable and connecting the wires by denuding and then flattening and soldering the wires, and binding the same together with a wrapping of wire, then insulating them and wrapping them again with a strip of lead uniting the ends of the armor, and joining the ends of the lead armoring of the sections by means of a plain or corrugated sleeve of lead or other proper material, and afterward filling the inclosed cavity with insulating material, as hereinafter explained.

Figure 1:
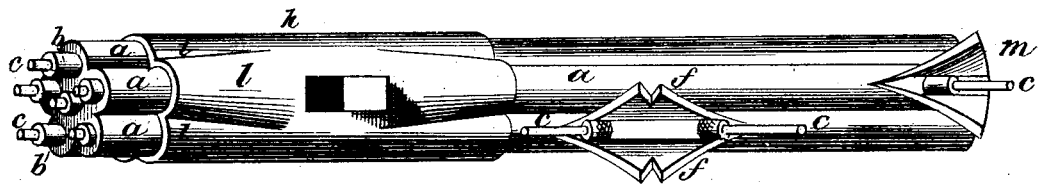
Figure 2:
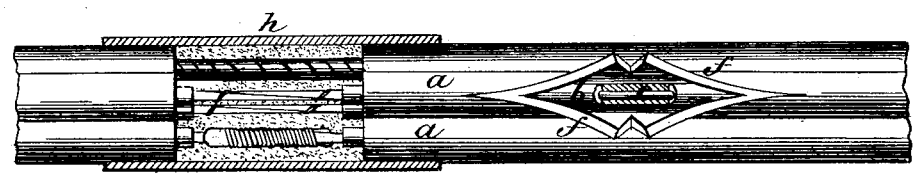
Figure 3:

In the drawings, Figure 1 represents an elevation of a section of cable, showing the method of connecting the sections and the manner of branching one or more of the conductors at any desired point. Fig. 2 represents a view, partly a side elevation and partly a longitudinal section, showing the manner of connecting the wires and forming the cuts of the section, and also the initial part of the method of branching the insulated wires or conductors; and Fig. 3, different views of the flattened wires.

The cable is constructed of an armor of lead or other ductile material, provided with a series of longitudinal ribs, $a$, through which extend longitudinally the wires or conductors $c$, surrounded with insulating material $b$. The grooves $k$ between the ribs may be of any desired shape or depth, and the armor may be provided with a central longitudinal passage, which may be corrugated or plain, for a group of insulated wires or conductors, or a single heavy wire or conductor sufficiently large to convey the strong currents necessary for electric motors or the production of the electric light or other like purposes. In order to form intermediate branches, the ribs are cut longitudinally and transversely, as shown in Figs. 1 and 2, forming lips $f$, which are bent outward laterally, exposing the wire or conductor which is denuded of its insulating material, as shown at $e$, Fig. 2. The wire or conductor is then cut, and the ends are bent outward, as shown in Fig. 1, and the cavity filled with insulating material, after which the lips are bent back into place and soldered, leaving the wires or conductors projecting at right angles or otherwise to be united to any desired branch line. A small tube of lead or other suitable material may be placed over each branch and soldered to the cable. To connect the wires or conductors of the different sections, the said wires are denuded and flattened at their ends, as indicated in Fig. 2 of the drawings by the letter $g$. To further secure the connection the matched ends of the wires or conductors are bound with fine copper or other wire or with fibrous material, and in the latter case a strip of lead is placed upon the wrapping, so as to connect with the armor to carry off the induced currents. When thus connected the armor of the section is united by means of a thin sheet of lead, $h$, which is preferably corrugated to correspond with the corrugations of the sections, the said sheet being bent into the form of a sleeve having its edges lap-jointed, and then soldered. An opening, $l$, having a flap, $l^2$, is formed in the side of the sleeve $h$, and after the sections have been connected insulating material is filled in through said opening, embedding the connected ends of the wires, thus insuring thorough insulation. After filling the flap is closed and soldered, and the union will be complete.

Having thus described my invention, what I claim, and desire to secure by Letters Patent, is—

1. The improved method of forming branch connections at any point in a lead-armored cable or section thereof, which consists in cutting through the armor transversely and longitudinally a suitable distance, opening the divided parts out, severing the conductor and bending each of the ends outward, and finally filling the cavity with insulating material and closing the parts of the armor, substantially as specified.

2. The method herein described of connecting two or more sections of a lead-armored cable, which consists in first flattening the ends of the wires to a tapering form, then lapping and soldering them, then wrapping them with wire, then insulating them and inclosing the insulated joint of each wire with a wrapping of thin lead extending from one section of the lead armor to the other, then placing an outer leaden sleeve over the ends of the two cable-sections and soldering the same, and finally filling the space within the joint with insulating material, substantially as described.

In testimony that I claim the foregoing as my own I affix my signature in presence of two witnesses.

RICHARD S. WARING.

Witnesses:
J. S. KIRK,
E. S. THOMAS.